United States Patent [19]

Nakanishi

[11] Patent Number: 5,151,835
[45] Date of Patent: Sep. 29, 1992

[54] CASSETTE DETECTING DEVICE FOR CASSETTE LOADING MECHANISM

[75] Inventor: Yasuyuki Nakanishi, Sanda, Japan

[73] Assignee: Mitsubishi Denki Kabushiki Kaisha, Japan

[21] Appl. No.: 623,444

[22] Filed: Dec. 17, 1990

[30] Foreign Application Priority Data

Apr. 25, 1989 [JP] Japan .................. 1-103415

[51] Int. Cl.⁵ .................. G11B 5/008; G11B 17/02
[52] U.S. Cl. .................................................. 360/96.5
[58] Field of Search .................. 360/96.5, 96.6, 93, 360/96.1

[56] References Cited

U.S. PATENT DOCUMENTS

| | | | |
|---|---|---|---|
| 4,071,860 | 1/1978 | Watanabe et al. | 360/96.5 |
| 4,757,400 | 7/1988 | Park | 360/96.5 |
| 4,864,439 | 9/1989 | Duurland | 360/96.5 |
| 5,053,902 | 10/1991 | Kato | 360/96.5 |

FOREIGN PATENT DOCUMENTS

| | | |
|---|---|---|
| 58-12162 | 1/1983 | Japan . |
| 58-26361 | 2/1983 | Japan . |
| 62-217459 | 9/1987 | Japan . |
| 62-243151 | 10/1987 | Japan . |
| 63-86140 | 4/1988 | Japan . |

Primary Examiner—John H. Wolff
Attorney, Agent, or Firm—Leydig, Voit & Mayer

[57] ABSTRACT

A cassette detecting device for a cassette loading mechanism comprises a detecting member movably supported on a frame for controlling the operation of the cassette loading mechanism when the cassette is in a predetermined position. The detecting member comprises engagement portions for engaging with the leading edge of the cassette at two positions spaced apart from each other, and a space is defined between the engagement portions for receiving therein a corner portion of the cassette when the cassette is not properly held within the cassette holder and for disabling the detecting member into the actuated position. The detecting member is movably supported on the frame substantially in parallel to the direction of insertion of the cassette. The detecting member is connected to one end of a lever which is pivoted to the frame.

12 Claims, 7 Drawing Sheets

CASSETTE DETECTING DEVICE FOR CASSETTE LOADING MECHANISM

TECHNICAL FIELD

This invention relates to a cassette detecting device for a cassette loading mechanism and, more particularly, to a cassette detecting device suitable to be used in a cassette loading mechanism which is displaceable between a cassette insertion position and a cassette push-in position with a cassette held therein.

TECHNICAL BACKGROUND

Figure 1:
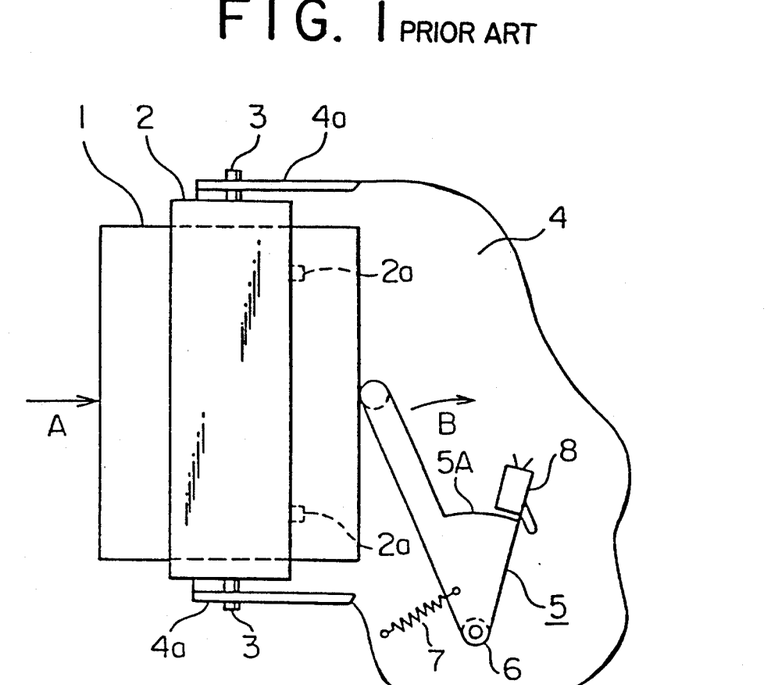
FIG. 1 is a schematic plan view illustrating the insertion position in which the cassette is inserted within a cassette loading mechanism having a conventional cassette detecting device.
Figure 2:
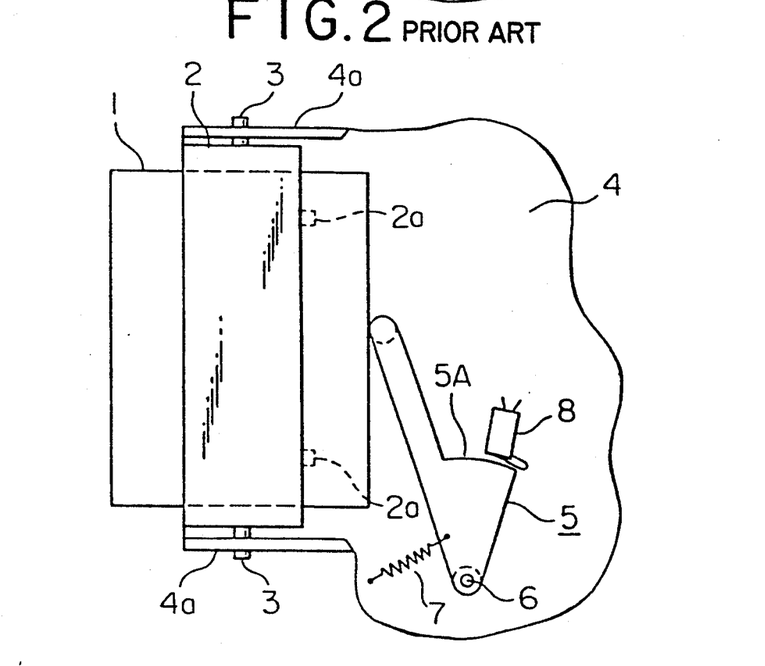
FIG. 2 is a schematic plan view illustrating the push-in position in which the cassette is pushed into a cassette loading mechanism having a conventional cassette detecting device.
Figure 3:
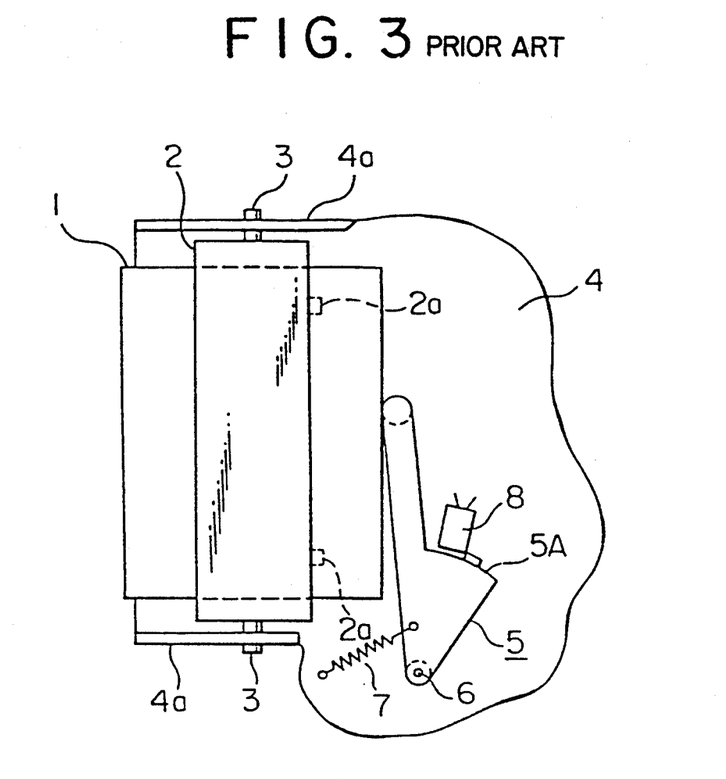
FIG. 3 is a schematic plan view illustrating the loaded position in which the cassette is loaded in the cassette loading mechanism having a conventional cassette detecting device.
Figure 4:
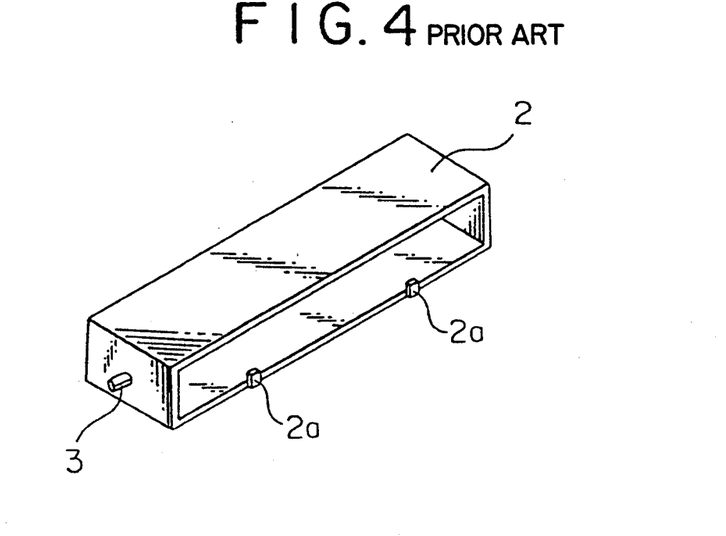
FIG. 4 is a perspective view illustrating the cassette holder of the conventional cassette loading mechanism shown in FIGS. 1 to 3.

FIGS. 1 to 3 are schematic plan view of the main portion of a conventional cassette loading mechanisms the cassette loading mechanism is illustrated in a series of modes of operation from a position in which a cassette is being inserted and to a position in which the cassette is displaced to a mounted position through a push-in position. In the figures, a recording medium cassette 1 containing a magnetic tape, for example, is provided with a slider for opening and closing the cover (not illustrated). A cassette holder 2 having a box-shaped cross section for holding the cassette 1 is best illustrated in FIG. 4. The leading edge of the cassette holder 2 has a pair of pawls 2a for engaging and shifting the slider on the cassette 1. Guide pins 3 are planted at both sides of the cassette holder 2. A frame 4 is of a U-shaped cross section having guide holes (not shown) in the respective side portions 4a for guiding the guide pins 3. A detecting member 5 (lever) is pivotally supported about the shaft 6 at the deeper side of the frame 4, having an arc portion 5A exhibiting a cam function and an engaging portion engageable with the cassette 1. A spring biasing means 7 is disposed between the frame 4 and the lever 5 for biasing the lever 5 into an inoperated position. A detection element 8 (start switch) is disposed in the vicinity of a corner portion of the arc 5A of the lever 5 to be activated in accordance with the movement of the lever 5 for controlling the cassette loading mechanism.

In the conventional cassette loading mechanism of the above construction, when the cassette 1 is inserted into the cassette holder 2 in the direction of an arrow A, the slider of the cassette 1 engages the pawls 2a of the cassette holder 2 to move the slider into a released position, so that the cassette is brought into a position in which its cover can be opened. In this position, since the leading edge of the cassette 1, as viewed in the direction of insertion, does not rotate the tip of the lever 5, the cassette 1 is held within the cassette holder 2 without activating the start switch 8 (detection element). This position is referred to as a cassette insertion position.

Then, when the cassette 1 is further pushed forward from the insertion position shown in FIG. 1, in the direction of the arrow A, the cassette 1 is moved against the biasing force of the spring (not shown) biasing the cassette holder 2 in the direction opposite to the direction of insertion of the cassette 1. Thus, in the push-in position illustrated in FIG. 2 in the cassette 1 is pushed within the cassette loading mechanism together with the cassette holder 2 beyond the insertion position illustrated in FIG. 1. In this position, the leading edge of the cassette 1 pushes the engagement portion of the lever 5 to rotate the lever 5 clockwise and the start switch 8 is switched to the actuated position by the cam surface 5A of the lever 5.

Thus, the start switch 8 detects that the rotational position of the lever 5 or the position of the cassette 1 is changed the insertion position to the pushed-in position, upon which a drive unit (not illustrated) is energized to move the cassette holder 2 with the cassette 1 therein deep into the frame 4 until it reaches the predetermined mount position illustrated in FIG. 3. When the cassette holder 2 is being placed in the mount position, it is moved in the direction from the front side to the back side plane of the figure. The cover (not shown) of the cassette 1 is opened during the above movement.

Figure 5:
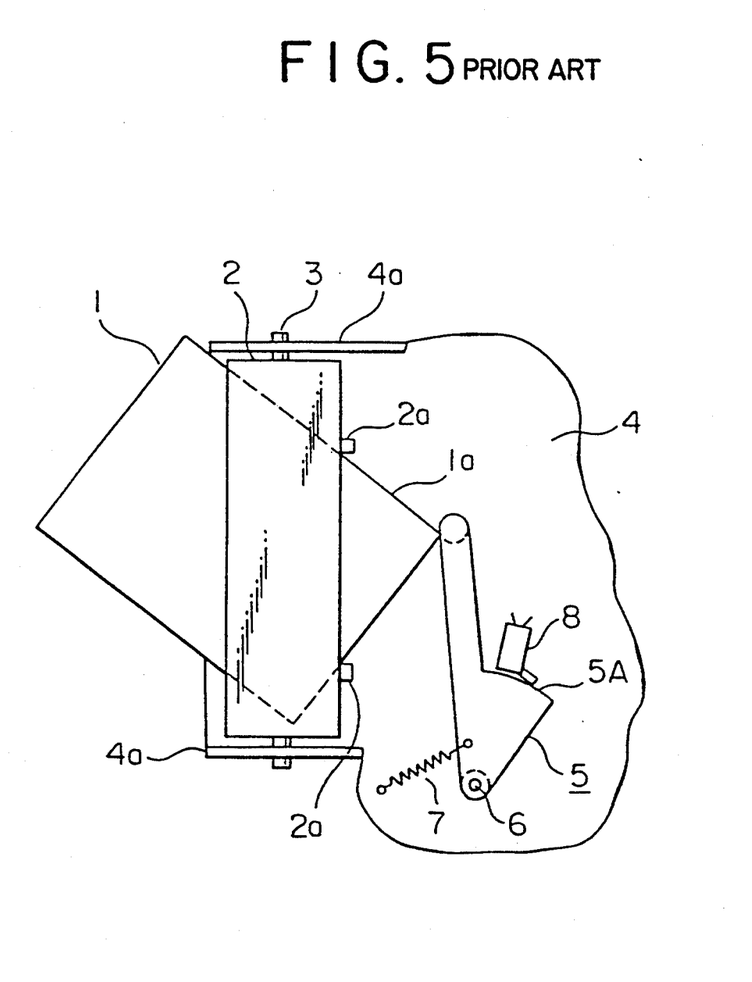
FIG. 5 is a schematic plan view illustrating the state of the cassette detecting device when the cassette is inserted in a tilted, position into the conventional cassette loading mechanism illustrated in FIGS. 1 to 3.

In the conventional cassette loading mechanism of the above construction, the detection of the position of the cassette is achieved by causing the single engagement portion of the lever 5 of the detection member to engage the central portion of the leading edge of the cassette 1. The cassette 1 is arranged to be moved to a predetermined mounted position on the basis of the results of such detection. However, even when the cassette 1 is inserted at a skewed position with respect to the cassette holder 2 as illustrated in FIG. 5, the corner portion 1a of the cassette 1 abuts the tip portion of the lever 5 and rotates it. This rotation is detected by the start switch 8 and the drive unit for driving the cassette holder 2 toward the predetermined mounted position is energized with the cassette 1 not properly inserted. When the cassette 1 and the cassette holder 2 are moved under such conditions, they interfere with the components of the cassette loading mechanism during the movement, thus disadvantageously damaging the mechanism and the cassette 1.

DISCLOSURE OF THE INVENTION

This invention has been made to solve the above-discussed problems and has as its object the provision of a cassette detecting device for a cassette loading mechanism in which erroneous operation of a cassette holder can be prevented when a cassette is not properly inserted into the cassette holder.

In view of the above object, the cassette detecting device for a cassette loading mechanism of the present invention resides in a cassette detecting number. The cassette detecting device is used with a cassette loading mechanism having a frame and a cassette holder movably disposed on the frame, for detecting the position of the cassette relative to the frame for controlling the operation of the cassette loading mechanism. The cassette is movable between an insertion position in which the cassette is inserted into an held within the cassette holder, and a push-in position in which the cassette, together with the cassette holder, is pushed beyond the insertion position into the cassette loading device. The cassette detecting device comprises a detecting member movably supported on the frame, where the detecting member moves into an inactuated position when the cassette is in the insertion position and into an actuated position by being engaged and pushed by a leading edge of the cassette when the cassette is in the push-in position. The device also features biasing means for biasing the detecting member into the inactuated position, and a detecting element operable in response to the movement of the detecting member for controlling the cassette loading device. The cassette detecting device is characterized in that the detecting member comprises engagement portions for engaging with the leading edge of the cassette at two positions spaced apart from each other. The engagement portions define a space for receiving therein a corner portion of the cassette when the cassette is not properly held within the cassette holder and for disabling the detecting member into the actuated position.

In a preferred embodiment, the detecting member is movably supported on the frame substantially in parallel to the direction of insertion of the cassette, or the detecting member is connected to one end of a lever pivoted to the frame and the detecting member is operatively connected to the lever.

In another preferred embodiment, the detecting member comprises a first and a second lever combined in a scissors-like linkage each connected at one end to the frame, pivotally connected at a mid-portion and constituting the engagement portion at the other end.

According to the present invention, the cassette is not detected when the cassette is not properly inserted into the cassette holder, thereby prevent the cassette holder from malfunctioning and being damaged or broken.

BEST MODE FOR CARRYING OUT THE INVENTION

Figure 6:
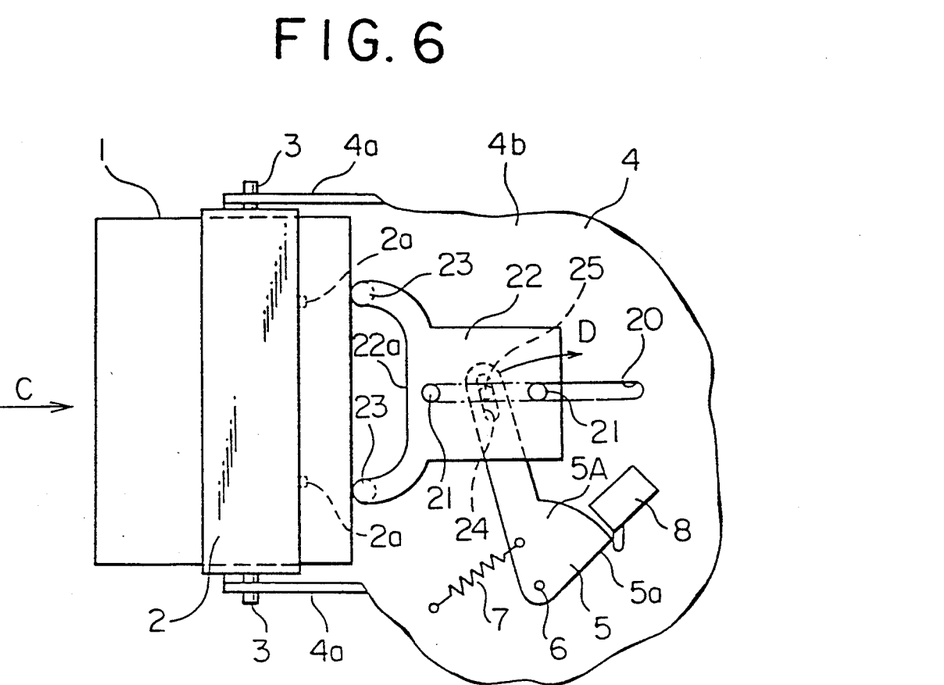
FIG. 6 is a schematic plan view illustrating the insertion position in which the cassette is inserted into the cassette loading mechanism having the cassette detecting device of the present invention.
Figure 7:
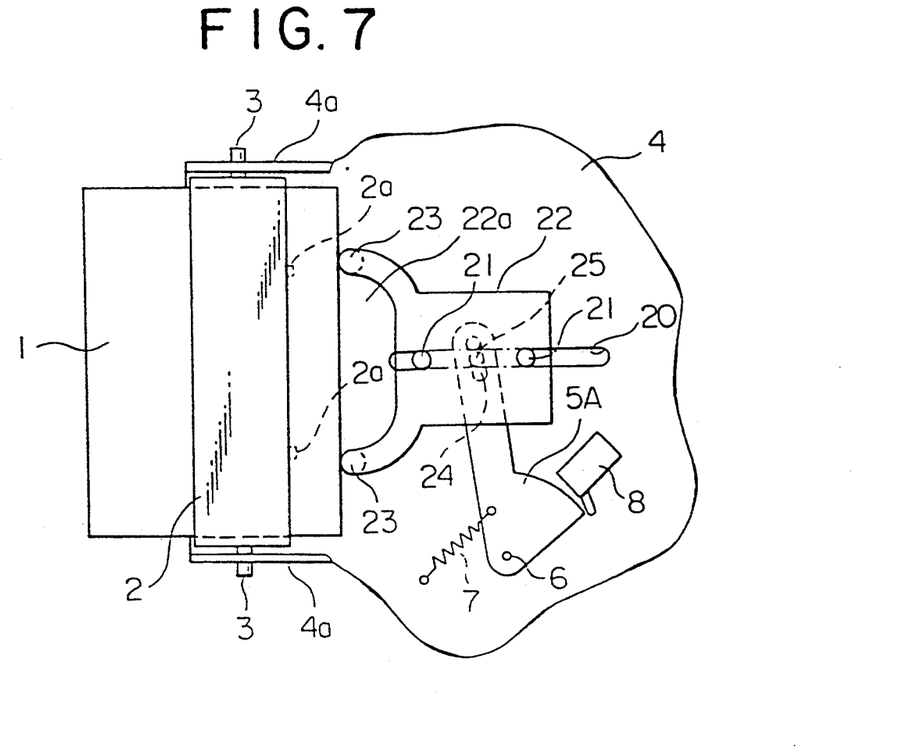
FIG. 7 is a schematic plan view illustrating the push-in position in which the cassette is pushed into the cassette loading mechanism having the cassette detecting device of the present invention.
Figure 8:
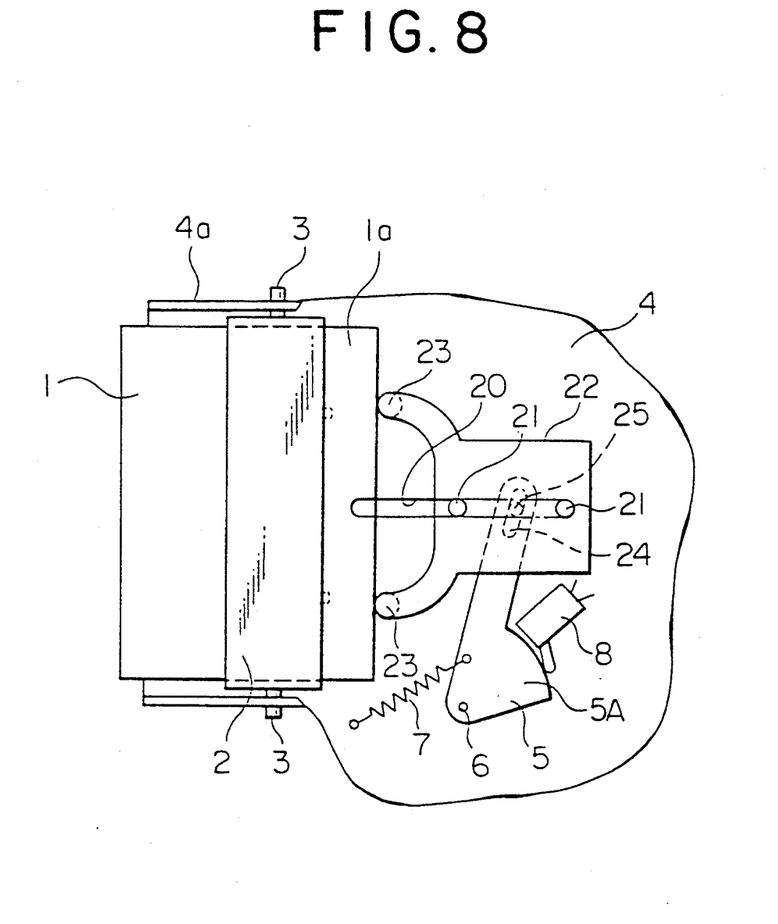
FIG. 8 is a schematic plan view illustrating the loaded position in which the cassette is loaded in the cassette loading mechanism having the cassette detecting device of the present invention.

FIGS. 6 to 8 are schematic plan views of the main portion of the cassette loading mechanism. The Figures illustrate a series of operating modes from the insertion of the cassette to the mounted position via push-in position when a magnetic tape containing cassette 1 containing therein is loaded into the cassette loading mechanism having the cassette detecting device of the present invention.

The cassette 1 is a well known recording medium. Cassette 1 features a cover that can be opened or closed for the access to and protection of the inner magnetic tape (not illustrated). The cassette 1 is also provided with a slider (not shown) movable between a locked position in which the cover cannot be opened and a released position in which the cover can be opened. The cassette holder 2 may be a well known type, and has a box-shaped cross-section for holding the cassette 1. As best illustrated in FIG. 4, the cassette holder 2 is provided with a pair of claws 2a which engage the slider of the cassette 1 to move it and guide pins 3 planted on both sides of the cassette holder 3.

The cassette loading mechanism comprises a frame 4 substantially similar to well known structures. The frame 4 is a member having a substantially U-shaped cross-section including side walls 4a including an L-shaped guide hole (not shown) for guiding the guide pins 3 of the cassette holder 2 and a base plate 4b connected between two side walls 4a.

In the base plate 4b of the frame 4, a guide hole 20 extending substantially in parallel to the direction of movement of the cassette 1 is formed. A guide pin 21 is inserted into the guide hole 20 so as to support a detecting member 22 movable substantially in parallel to the direction of insertion of the cassette 1. The detecting member 22 is movably supported on the frame 4 and is brought into an inactuated position (FIG. 6) when the cassette 1 is in an insertion position (FIG. 6). The detecting member 22 is brought into an actuated position (FIG. 7) by being pushed by a leading edge of the cassette 1 as viewed in the direction of its insertion into the cassette loading mechanism when the cassette 1 is in a push-in position (FIG. 7). The detecting member 22 of this embodiment is an integral plate member having two engaging portions 23 projecting from a substantially rectangular main body. These engaging portions 23 engage the leading edge of the cassette 1 at two positions spaced apart in the direction parallel to the leading edge of the cassette 1. Between these engaging portions 23, a space 22a is defined. This space 22a provided to receive a corner 1a of the cassette 1 that projects from cassette holder 2 when the cassette 1 is not properly held within the cassette holder 2 so that the cassette 1 does not engage with the detecting member 22 and that the detecting member 22 is not moved into the actuated position (see FIGS. 9 and 10).

The cassette detecting device for a cassette loading mechanism also comprises a biasing member 7 which is a tension spring for biasing the detecting member 22 toward the inactuated position of FIG. 6 and a detecting element 8 which is a micro switch for controlling the cassette loading mechanism in response to the movement of the detecting member 22. In the illustrated embodiment, the detecting member 22 is biased toward the inactuated position by the spring 7 through the detecting lever 5. The detecting lever 5 is connected to the frame 4 at one end by a pin 6 and to the detecting member 22 at the other end by an elongated hole 24 and a pin 25 on the detecting member 22. The detecting lever 5 has formed thereon a cam 5A so that the rotation of the detecting lever 5 due to the detecting member 22 may be detected by the micro switch 8.

With the cassette loading mechanism of the above construction, when the cassette 1 is inserted into the cassette holder 2 in the direction of the arrow C as illustrated in FIG. 6, the slider (not shown) of the cassette 1 engages with the claws 2a of the cassette holder 2 to be moved into the released position, allowing the cover of the cassette 1 to be opened. In this state, the leading edge of the cassette 1 has not yet pushed and rotated the tip of the detecting lever 5, so that the cassette 1 is held within the cassette holder 2 in the state in which the start switch 8 which is the detecting element is not actuated. This state is referred to as the cassette insertion position.

Then, when the cassette 1 is pushed in the direction of an arrow C beyond the insertion position shown in FIG. 6, the cassette 1 is moved against the biasing action of the spring (not shown) urging the cassette 1 in the direction opposite to the cassette insertion direction, whereby the cassette 1 together with the cassette holder 2 is moved into the pushed-in position illustrated in FIG. 7. In this position, the leading edge of the cassette 1 engages with two engaging portions 23 of the detecting member 22 to push the detecting member 22 in the right-hand direction in the figure against the action of the spring 7, whereby the detecting lever 5 is rotated clockwise to shift the start switch 8 into the actuated position by the cam surface 5A of the detecting lever 5.

In this manner, the start switch 8 detects the rotation of the detecting lever 5, i.e. the positional change of the cassette 1 from the insertion position to the push-in position, whereupon an drive unit (not illustrated) is energized to drive the cassette holder 2 together with the cassette 1 deeper into the frame 4 until they are positioned in the mounted position illustrated in FIG. 8. During the movement of the cassette holder 2 to the mounted position, the cassette holder 2 is moved perpendicularly toward the plane of the figure, during which the lid (not shown) of the cassette 1 is pushed open by the engaged stationary engagement portion, allowing access to the magnetic tape.

Figure 9:
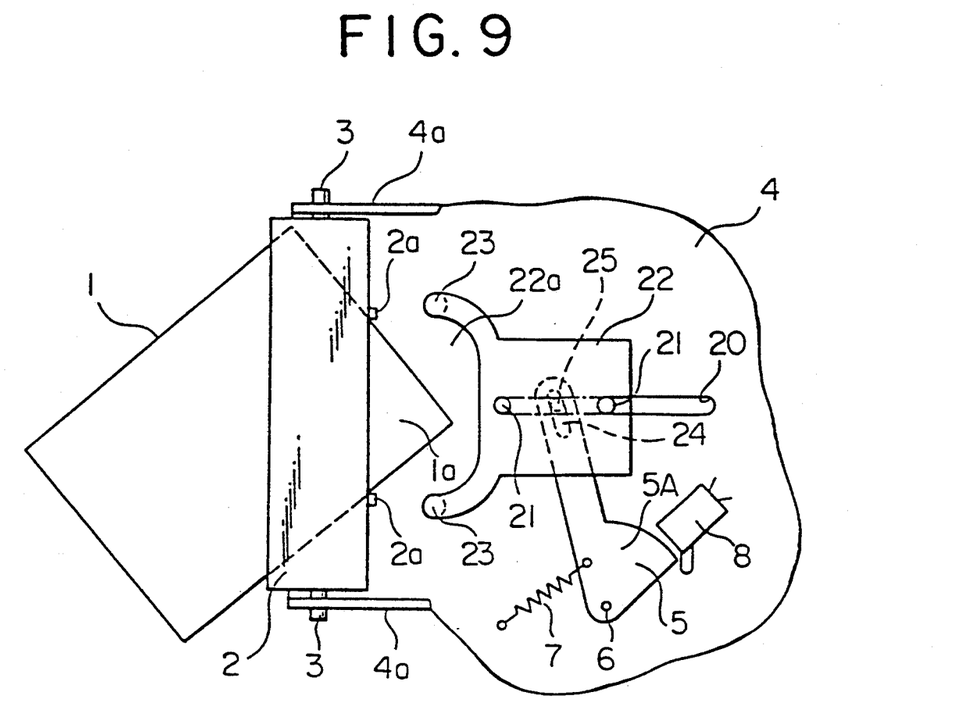
FIG. 9 is a schematic plan view illustrating the state in which the cassette is inserted in a tilted position into the cassette holder of the cassette loading mechanism of the present invention illustrated in FIGS. 6 to 8.
Figure 10:
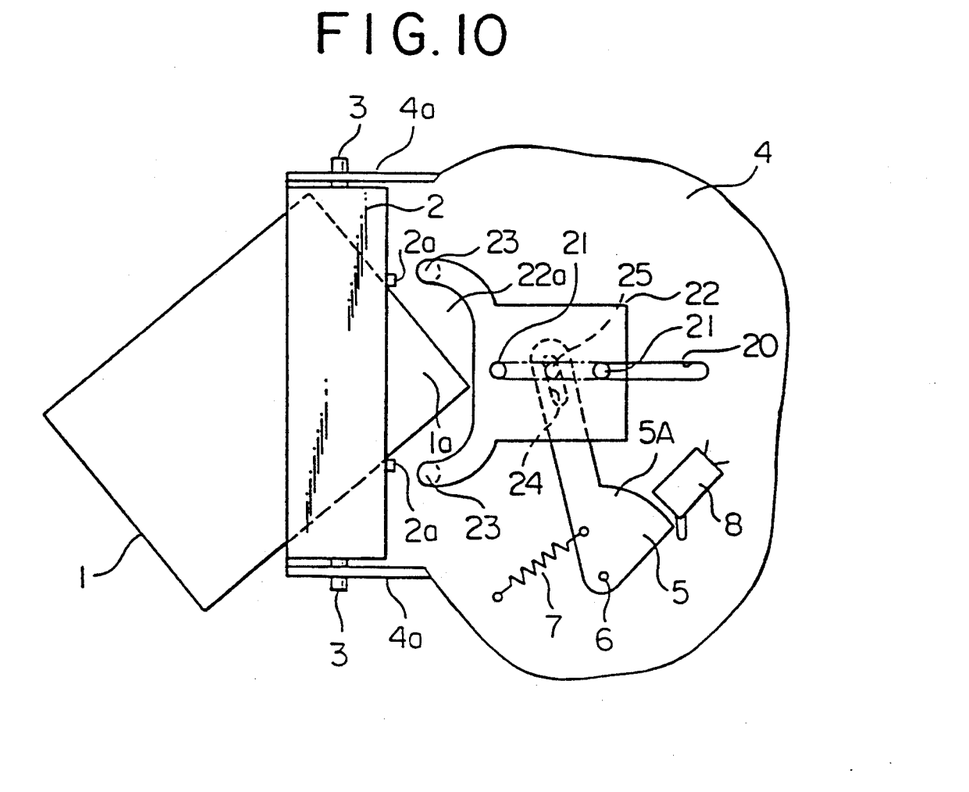
FIG. 10 is a schematic plan view illustrating the state in which the cassette is pushed-in from the state illustrated in FIG. 9.

As illustrated in FIG. 9, when the cassette 1 is inserted into the cassette holder 2 in the tilted position, the claws 2a do not contact with the predetermined positions on the slider, so that the slider remains closed without exposing the tape. Also, while the cassette 1 is stopped by the claws 2a in the tilted state as illustrated in FIG. 9, the corner portion 1a of the cassette 1 is received within the space 22a defined between the engaging portions 23 without contacting and pushing the detecting member 22 which is the slide lever. When the cassette 1 is further depressed from the position shown in FIG. 9, the cassette holder 2 together with the cassette 1 is moved further beyond the position show in FIG. 9 (which corresponds to the insertion position shown in FIG. 6) by a predetermined position against the biasing means acting in the direction opposite to the cassette insertion direction until it is moved deep into the pushed-in position illustrated in FIG. 10. In this case also, the corner portion 1a of the cassette 1 does not contact any portion of the detecting member 22, causing no movement of the detecting member 22, whereby the start switch 8 is prevented from being turned on and starting the operation of the cassette loading mechanism. Therefore, the improper insertion of the cassette 1 is brought to the operator's attention and the inserting operation can be tried again. Thus the damages to the cassette 1 or the cassette loading mechanism can be prevented.

Figure 11:
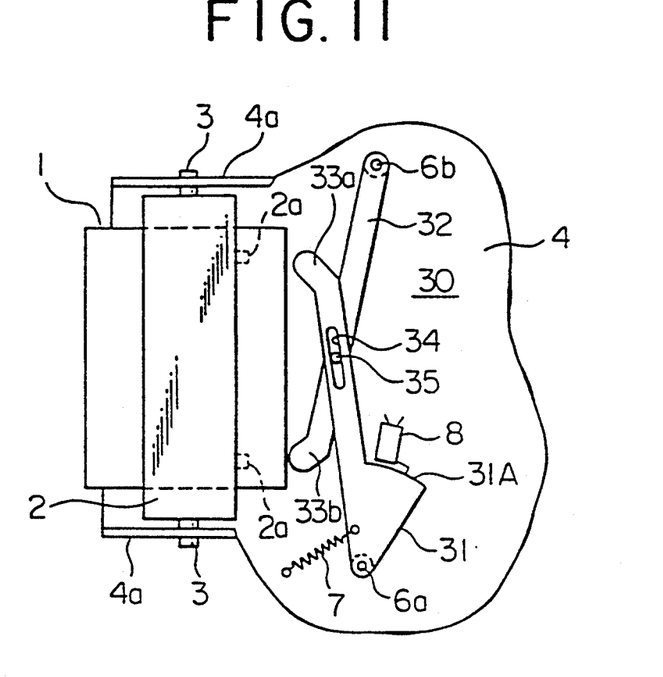
FIG. 11 is a schematic plan view illustrating another embodiment of the cassette loading mechanism of the present invention.
Figure 12:
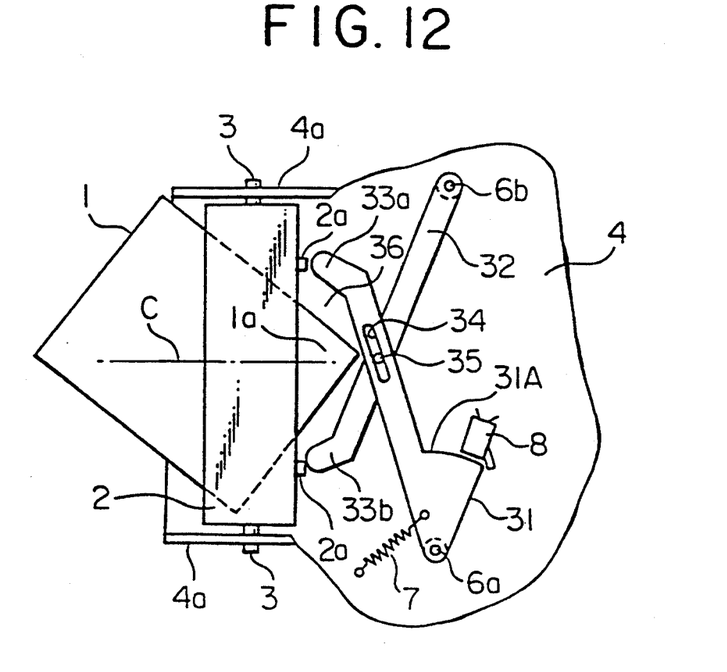
FIG. 12 is a schematic plan view illustrating the state in which the cassette is loaded in the cassette loading mechanism having the cassette detecting device of the present invention.

FIGS. 11 and 12 illustrate another embodiment of the cassette detecting device for a cassette loading mechanism of the present invention. In this embodiment, the detecting member 30 comprises a first and a second lever 31 and 32, respectively, combined in a scissors-like linkage each connected at one end to the frame, pivotally connected at a mid-portion and constituting the engagement portion at the other end. The first detecting lever 31 is an elongated member pivotally connected at one end by a pin 6a to the frame 4 and having a cam portion 31A similar to that of the detecting member 22 illustrated in FIGS. 6 to 10 for actuating the microswitch 8. At the other end of the first detecting lever 31, an engagement portion 33a is formed for engaging with the leading edge of the cassette 1, and an elongated hole 34 is formed in the central portion. The second detecting lever 32 is an elongated member pivotally connected at one end by a pin 6b to the frame 4, and having an engagement portion 33b is formed at the other end for engaging the cassette 1, and a pin 35 for engaging with the elongated hole 34 of the first detecting lever 31 is provided at the central portion. Between two detecting levers 31 and 32, a space 36 for receiving the corner portion 1a of the cassette 1 as illustrated in FIG. 12 so that the levers are not actuated by the corner portion 1a.

In this embodiment also, the cassette detecting device does not erroneously operate when the cassette 1 is improperly inserted.

While the present invention has been described in terms of an embodiment of the cassette having a magnetic tape contained therein, the present invention is equally applicable to a cassette having a magnetic disc or an optical disc contained therein. Also, the switch for energizing the drive power source for driving the cassette into the cassette loaded position is explained as being actuated by shifting the detecting member by manually depressing the cassette from the insertion position, the manual depression of the cassette may be eliminated by providing a play-start button for energizing the drive power source.

As has been described, according to the cassette detecting device for a cassette loading mechanism of the present invention, the detecting member comprises engagement portions for engaging with the leading edge of the cassette at two positions spaced apart from each other, and a space is defined between the engagement portions for receiving therein a corner portion of the cassette when the cassette is not properly held within the cassette holder and for disabling the detecting member to move into the actuated position, so that even when the cassette is not properly inserted into the cassette holder, the cassette loading mechanism is prevented from being erroneously operated by the corner portion of the cassette and from causing the cassette holder to be moved into the cassette loaded position, whereby the cassette or the cassette loading mechanism can be prevented from going out of order or being damaged.

I claim:

1. A cassette detecting device, for use with a cassette loading mechanism having a frame and a cassette holder movably disposed on said frame,
   said cassette detecting device comprising:
   a detecting member movably supported on the frame, said detecting member being urged into an actuated position by a leading edge of a cassette inserted into the cassette holder in a push-in position;
   biasing means for biasing said detecting member into a predetermined position; and
   a detecting element responsive to movement of said detecting member for controlling a cassette loading device;
   said detecting member further including engagement portions for engaging with leading edge of a cassette at two positions spaced apart from each other, said engagement portions defining therebetween a space for receiving therein a corner portion of a cassette when the cassette is not properly held within a cassette holder and for disabling said detecting member into said actuated position.

2. A cassette detecting device for a cassette loading device as claimed in claim 1, wherein said detecting member is movably supported on said frame substantially in parallel to the direction of insertion of a cassette.

3. A cassette detecting device as claimed in claim 1 further comprising a lever having first and second end portions, the first end portion being pivotally connected to the frame and the second end portion being slidably connected to said detecting member.

4. A cassette detecting device as claimed in claim 3 wherein the first end portion of said lever includes a cam surface which actuates said detecting element when a cassette is inserted into the cassette holder device in a push-in position.

5. A cassette detecting device as claimed in claim 1 wherein said biasing means is a spring.

6. A cassette detecting device as claimed in claim 1 wherein said detecting element is a switch.

7. A cassette detecting device for use with a cassette player having a frame and a cassette holder movably disposed on the frame, said cassette detecting device comprising:
   a detecting member having two engaging portions spaced apart from each other and projecting from a body portion which is movably engaged with the frame;
   a detecting lever having first and second end portions, said detecting lever being pivotally connected to the frame at the first end portion and slidably connected to said detecting member at the second end portion; and
   a biasing member connected to said detecting lever at said first end such that said detecting member is biased in a cassette insertion position.

8. A cassette detecting device as claimed in claim 7 wherein the first end portion of said lever includes a cam surface.

9. A cassette detecting device as claimed in claim 7 further comprising a plurality of pins projecting from said detecting member.

10. A cassette detecting device as claimed in claim 7 wherein the second end portion of said detecting lever includes an elongated aperture which is engaged with on of said plurality of pins to form a slidable connection.

11. A cassette detecting device as claimed in claim 7 wherein said biasing means is a spring.

12. A cassette detecting device for use with a cassette loading mechanism having a frame and a cassette holder movably disposed on the frame, said cassette detecting device comprising:
   a detecting member having a body portion which is movably connected with the frame and which has a number of engagement members disposed at one end and extending from the body portion in a direction of movement of said detecting member;
   a detecting lever having first and second end portions, said detecting lever being pivotally connected to the frame at the first end portion and slidably connected to said detecting member at the second end portion;
   a biasing member connected to said detecting lever at said first end such that said detecting member is biased in a cassette insertion position; and
   a detecting element which is actuated by the first end portion of said detecting lever when a cassette is inserted into the cassette holder device in a push-in position.

* * * * *